(12) United States Patent
Yang

(10) Patent No.: US 7,870,358 B2
(45) Date of Patent: Jan. 11, 2011

(54) ZERO-PENALTY RAID CONTROLLER MEMORY LEAK DETECTION AND ISOLATION METHOD AND SYSTEM UTILIZING SEQUENCE NUMBERS

(75) Inventor: Jinchao Yang, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 979 days.

(21) Appl. No.: 11/715,680

(22) Filed: Mar. 7, 2007

(65) Prior Publication Data

US 2008/0222450 A1 Sep. 11, 2008

(51) Int. Cl.
  *G06F 12/02* (2006.01)
  *G06F 11/00* (2006.01)
(52) U.S. Cl. .......................... 711/170; 714/8
(58) Field of Classification Search ........................ None
  See application file for complete search history.

(56) References Cited

U.S. PATENT DOCUMENTS

| 5,842,019 | A | * | 11/1998 | Kolawa et al. | ............... | 717/130 |
| 5,953,530 | A | | 9/1999 | Rishi et al. | ................. | 395/704 |
| 6,658,652 | B1 | | 12/2003 | Alexander, III et al. | ..... | 717/128 |
| 2004/0172579 | A1 | | 9/2004 | Fu | ............... | 714/47 |
| 2005/0204342 | A1 | * | 9/2005 | Broussard | ................... | 717/124 |
| 2005/0235127 | A1 | | 10/2005 | Muthiah et al. | ............ | 711/170 |
| 2005/0240747 | A1 | | 10/2005 | Raut | .......................... | 711/170 |
| 2007/0027942 | A1 | | 2/2007 | Trotter | ....................... | 707/205 |

OTHER PUBLICATIONS

C++ Memory and Resource Management, Addison-Wesley, Informit Network Exploring Windows 2000 Memory, Addison-Wesley, Informit Network LSI Storage Performance Tuning, SGI.

* cited by examiner

*Primary Examiner*—Denise Tran
(74) *Attorney, Agent, or Firm*—Kermit D. Lopez; Luis M. Ortiz; Ortiz & Lopex, PLLC

(57) ABSTRACT

A method and system for detecting and isolating memory leak in RAID controllers utilizing sequence numbers. The system monitors whether the count of un-freed memory blocks for a sequence number (SN) zone (after a start-of-day SOD operation, but smaller than the current sequence number zone) is not eventually decremented to zero. The memory leak can be detected when un-freed memory blocks exist and follow a similar pattern with respect to all other adjacent SN zones. The detected memory leak can be isolated utilizing shell commands, task information, caller information, sequence number, memory allocation size and a pointer to the next allocated memory block.

18 Claims, 9 Drawing Sheets

ZERO-PENALTY RAID CONTROLLER MEMORY LEAK DETECTION AND ISOLATION METHOD AND SYSTEM UTILIZING SEQUENCE NUMBERS

TECHNICAL FIELD

Embodiments are generally related to data-processing systems and methods. Embodiments are also related to RAID (Redundant Array of Independent Disks) controllers utilized in data-processing systems and devices. Embodiments are additionally related to techniques for detecting and isolating memory leak in a software application.

BACKGROUND OF THE INVENTION

In computing systems, including general purpose and embedded implementations, resource and memory management are very important to proper system operation. Memory management typically occurs at several levels, such as, for example, hardware memory management, OS (Operating System) memory management, and application memory management. OS and application memory management rely on various software techniques for the allocation and de-allocation of memory utilized by the system. In the OS, memory is allocated to user programs, and reused by other programs when it is no longer required. Application memory management typically involves supplying the memory required for program objects and data structures from the limited resources available, and recycling that memory for reuse when it is no longer required.

One common form of memory allocation error is memory leak, which can be a major resource issue leading to system malfunctions and negative performance impacts. In general, a memory leak occurs when allocated memory is not freed after use, or when a needed reference to that allocated memory (e.g., a pointer to the memory allocation) is deleted thereby rendering the memory no longer reachable or "live" to the system. Memory leaks can take many forms (e.g. occurring in contiguous block or fragmentally), and can occur in a variety of different memory systems such as flattened memory architectures or those with virtual memory spaces. Reckless use of dynamic memory allocation can lead to memory management problems, which cause performance degradation, unpredictable execution or crashes.

RAID (Redundant Array of Independent Disks) controllers, an example of an embedded computing technology, typically need to support RTOS (Real Time Operating Systems), which are capable of multi-tasking as well as supporting dynamic memory allocations. Due to system complexity and performance requirements, both processor memory and cache memory need to be supported by one or more RAID controllers. Obviously, system memory management is critical among the many tasks that require dynamic memory allocation during program execution. RAID controller firmware, most probably written in C and C++, uses "malloc" and "new", respectively, for dynamic memory allocation from a "heap"; and additionally utilizes "free" and "delete" commands, which permit the memory to return to the heap after its use. Note that the term "heap" is also referred to as "memory pool".

For programs that are perfectly designed and implemented, except for memory pieces that are allocated at the start-of-the-day and need to be globally accessible afterwards (e.g., singletons), memory allocation should be balanced during normal operations to ensure that the computing system does not run out of resources.

For firmware programs running on RAID controllers, multiple tasks can be spawned to provide services at different contexts. Most of the time, however, the coordination and information exchange among the tasks results in a decoupling of memory allocation, which render potential memory leak detection and isolation operations more difficult. Information gathered by one task may be needed by another task from a different module via a so-called "pass by reference" (or pointer) mechanism. In this case, the memory blocks allocated can unlikely be freed by the same task. Passing host 10 requests to a destination driver using internal one or more buffer structures (to hold SCSI operations) are good examples of such situations.

The severity of this issue increases with the number of tasks and the complexity of the individual tasks. For a typical RAID controller, up to 60 tasks with different priorities may run simultaneously from a firmware image compiled from millions of lines of code. As a matter of fact, memory leak due to unbalanced memory allocation is a major problem faced by almost all large computer programs.

FIG. 1 illustrates a schematic diagram of a prior art information exchange system 100 including the depiction of decoupled memory allocation and free activities performed by different tasks. The prior art system 100 includes an event monitor 110 that monitors the scope of messages from other programs or user actions such as mouse clicks or key presses. A task scheduler 125 schedules Task T1 120, Task T2 130 and Task T3 135. Upon a request of a particular event, memory can be allocated from a heap 105 as shown at block 115. The task scheduler 125 then passes the Task T1 120 to Task T3 135 via a dBlock (not shown). The dBlock (not shown) can be processed and memory can be returned to the heap 105 as indicated respectively at blocks 140 and 145.

FIG. 2 illustrates the internal structure of a prior art allocated memory piece or mempiece 200. The mempiece 200 includes an actual memory allocated 215 and two memory headers such as "vxWorksMemBlk" 205 and "LSI_ESG_MEM_HOOK" 210.

The structure of mempiece 200 can be provided as indicated below:

```
struct memPiece
{
    struct vxWorksMemBlk
    {
        struct vxWorksMemBlk * next;
        unsigned int size : 31;
        unsigned int free : 1;
    };
    struct LSI_ESG_MEM_HOOK
    {
        unsigned long   signature;
        unsigned long   length;
        unsigned long   taskId;
        void *          vxwblock;
    };
    byte * memBody;
}
```

A structure is used to group variables together under one name. The mempiece structure depicted in FIG. 2 generally includes two structures "vxWorksMemBlk" and "LSI_ESG_MEM_HOOK". The structure "vxWorksMemBlk" includes a "vxWorksMemBlk" pointer for maintaining the address of a next adjacent block of memory allocated in memory pool. The structure "LSI_ESG_MEM_HOOK" includes the use of an unsigned signature variable to indicate the state (free or allocated) of memory and an unsigned long variable to determine which task allocates this chunk memory.

The common practice for isolating memory leak issue has involved either introducing an external utility program that "spies" or monitors programs or creating spy task(s) within an application that records that memory allocation/free process. In addition to the cost and development time incurred with both options, performance degradation due to extra overhead introduced by these spy utilities/tasks has been another major concern, especially for performance critical RAID controllers systems.

A need therefore exists for implementing a straight-forward and efficient memory leak detection and isolation mechanism, without introducing additional internal tasks or external utility programs, while minimizing system performance degradation. Cost efficiency should also be achieved.

BRIEF SUMMARY

The following summary is provided to facilitate an understanding of some of the innovative features unique to the disclosed embodiments and is not intended to be a full description. A full appreciation of the various aspects of the embodiments can be gained by taking the entire specification, claims, drawings, and abstract as a whole.

It is, therefore, one aspect of the present invention to provide for an improved data-processing system and method.

It is another aspect of the present invention to provide for a system and method for detecting and isolating memory leak in software applications.

It is a further aspect of the present invention to provide for a method and system for detecting and isolating memory leak in RAID controller utilizing sequence numbers.

The aforementioned aspects and other objectives and advantages can now be achieved as described herein. A method and system for utilizing sequence numbers for detecting and isolating memory leak in a data-processing system is disclosed. In general, a timestamp can be considered as useful information for each memory block allocated. The timestamp provides the "ages" for individual memory blocks stilt in use and an order of events that have occurred with respect to the data-processing system. The main concern with a real timestamp is the potential overhead caused by frequent system calls. The format and variable size to be used, as well as the system clock life cycle (without being over wrapped), are other concerns. A simplified timestamp solution can involve the use of a 64-bit (8-byte or 2-word) variable as the memory allocation sequence number.

The use of sequence numbers for detecting and isolating memory leak provides a simple, cost effective and efficient system. The system monitors whether the count of un-freed memory blocks for a sequence number (SN) zones (after SOD but smaller than the current sequence number zone) is eventually decremented to zero. The memory leak can be detected when un-freed memory blocks exist and follow a similar pattern for all other adjacent SN zones. The detected memory leak can be isolated using "memshow", "memoryShow" and "memLeakDebug" shell commands, task information, caller information, sequence number, memory allocation size and pointers to the next allocated memory block.

The disclosed embodiments offer a cost efficient solution because extra external products and additional development resources are not required. Such embodiments therefore offer efficient memory leak detection and isolation capabilities for controller products. Furthermore, such embodiments can be applied to different platforms and releases, as well as to firmware associated with different program languages, as the fundamental parts of the OS and system have not been changed. It is also expected that such embodiments can be applied to other embedded systems.

The disclosed embodiment also leaves room for optimization and performance tuning using a compiler directive mechanism. Resource requirement can be reduced by selecting variables of smaller (but sufficient) sizes. The disclosed embodiments additionally allow for the combinational use of memory diagnostic tools and programs.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing system and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and recordable media. An example of such a module is module 311 depicted in FIG. 3.

It is important to note that, although the embodiments are described in the context of a fully functional data-processing apparatus (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links. The logical operation steps depicted in FIG. 8 and FIG. 9 can, for example, be implemented in the context of such a software module.

Figure 3:
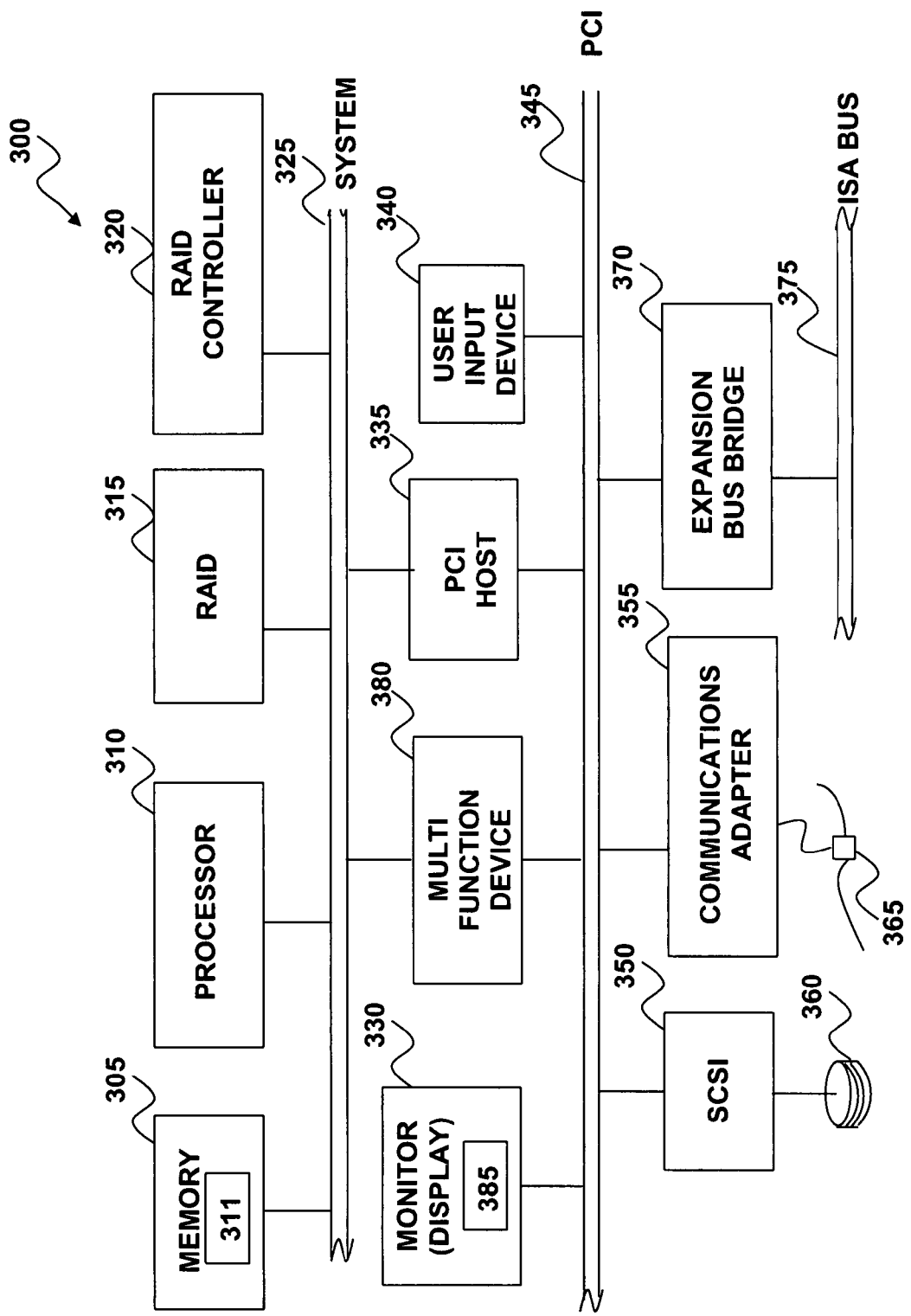
FIG. 3 illustrates a block diagram of a data-processing system, which can be utilized for detecting and isolating memory leak, in accordance with a preferred embodiment.

FIG. 3 illustrates a block diagram of a data-processing apparatus 300, which can be utilized for detecting and isolating memory leak, in accordance with a preferred embodiment. Data-processing apparatus 300 represents one of many possible data-processing and/or computing devices, which can be utilized in accordance with the disclosed embodiments. It can be appreciated that data-processing apparatus 300 and its components are presented for generally illustrative purposes only and do not constitute limiting features of the disclosed embodiments.

As shown in FIG. 3, a memory 305, a processor (CPU) 310, a Redundant Array of Independent Disk (RAID) 315, and a RAID controller 320 are generally connected to a system bus 325 of data-processing apparatus 300. RAID 315 is a technique and/or device for storing the same data in different places (thus, redundantly) on multiple hard disks. By placing data on multiple disks, I/O (input/output) operations can overlap in a balanced manner, thereby improving performance. Since multiple disks increase the MTBF (Mean Time Between Failures), storing data redundantly also increases fault tolerance. A RAID controller 320 is a device that manages the physical storage units in data-processing apparatus 300 as logical units.

Module 311 can be stored within memory 305 and then retrieved and processed via processor 310 to perform a particular task. A user input device 340, such as a keyboard, mouse, or another pointing device, can be connected to PCI (Peripheral Component Interconnect) bus 345. A multi function device 380, which can combine several core technologies, including image scanning, document printing, and fax signaling, into a single unit, can also be connected to PCI bus 345.

The processor (CPU) 310, RAID 315, and RAID controller (320) can be connected to a Peripheral Component Interconnect (PCI) local bus 345 through PCI host-bridge 335. The PCI Host Bridge 335 can provide a low latency path through which processor 310 may directly access PCI devices mapped anywhere within bus memory and/or input/output (I/O) address spaces. PCI Host Bridge 335 also can provide a high bandwidth path for allowing PCI devices to directly access RAID 315.

A communications adapter 355, a small computer system interface (SCSI) 350, and an expansion bus-bridge 370, are also generally attached to PCI local bus 345. The communications adapter 355 can be utilized for connecting data-processing apparatus 300 to a network 365. SCSI 350 can be utilized to control high-speed SCSI disk drive 360. An expansion bus-bridge 370, such as a PCI-to-ISA bus bridge, may be utilized for coupling ISA bus 375 to PCI local bus 345. Note that PCI local bus 345 can further be connected to a monitory 330, which functions as a display (e.g., a video monitor) for displaying data and information for a user and also for interactively displaying a graphical user interface (GUI) 385.

Note that the term "GUI" generally refers to a type of environment that represents programs, files, options and so forth by means of graphically displayed icons, menus, and dialog boxes on a computer monitor screen. A user can interact with the GUI 385 to select and activate such options by pointing and clicking with a user input device such as, for example, a pointing device such as a mouse, and/or with a keyboard. A particular item can function in the same manner to the user in all applications because the GUI 385 provides standard software routines (e.g., module 311) to handle these elements and reports the user's actions. The module 311 stores the memory leak detection and isolation algorithm using memory allocation sequence numbers.

The example embodiment generally utilizes a 64-bit (8-byte or 2-word) variable as the memory allocation sequence number. A sequence number can be composed of two unsigned integers, denoted by "globalSeqNumLow" and "globalSeqNumHi", each being a global variable with an initial value of 0. The initialization of variables "globalSeqNumLow" and "globalSeqNumHi" can be as follows.

static unsigned int globalSeqNumLow=0;

static unsigned int globalSeqNumHi=0;

In this sense, the range of the possible sequence number is [0, maxSeqNum], where "maxSeqNum" can be obtained as follows.

MAX((globalSeqNumHi<<32)+globalSeqNumLow)

Where, maximum values of "seqNumLow" and "seqNumHi" can be 0xFFFFFFFF (or 4,294,967,295). Therefore:

$$maxSeqNum = (0xFFFFFFFF << 32) + 0xFFFFFFFF$$
$$= 0xFFFFFFFFFFFFFFFF$$
$$= 18,446,744,073,709,551,615$$

Assuming the apparatus 300 possesses a memory allocation rate of 1000 allocations/second (a pretty high value), it takes about 584,942,417 (584 million) years for the number to be over wrapped. The incrementation of two variables can be provided by the following example pseudo-code.

```
if (memoryAllocation(memPiece) == SUCCESSFUL)
{
    if (globalSeqNumLow < 0xFFFFFFFF)
    {
       globalSeqNumLow++;
    }
    else
    {
```

-continued

```
        globalSeqNumLow = 0;
        globalSeqNumHi++;
    }
    memPiece->seqNumLow = globalSeqNumLow;
    memPiece->seqNumHi = globalSeqNumHi;
}
```

In the example pseudo-code provided above, the value memPiece can be a pointer to the chunk of memory dynamically allocated.

Figure 1:
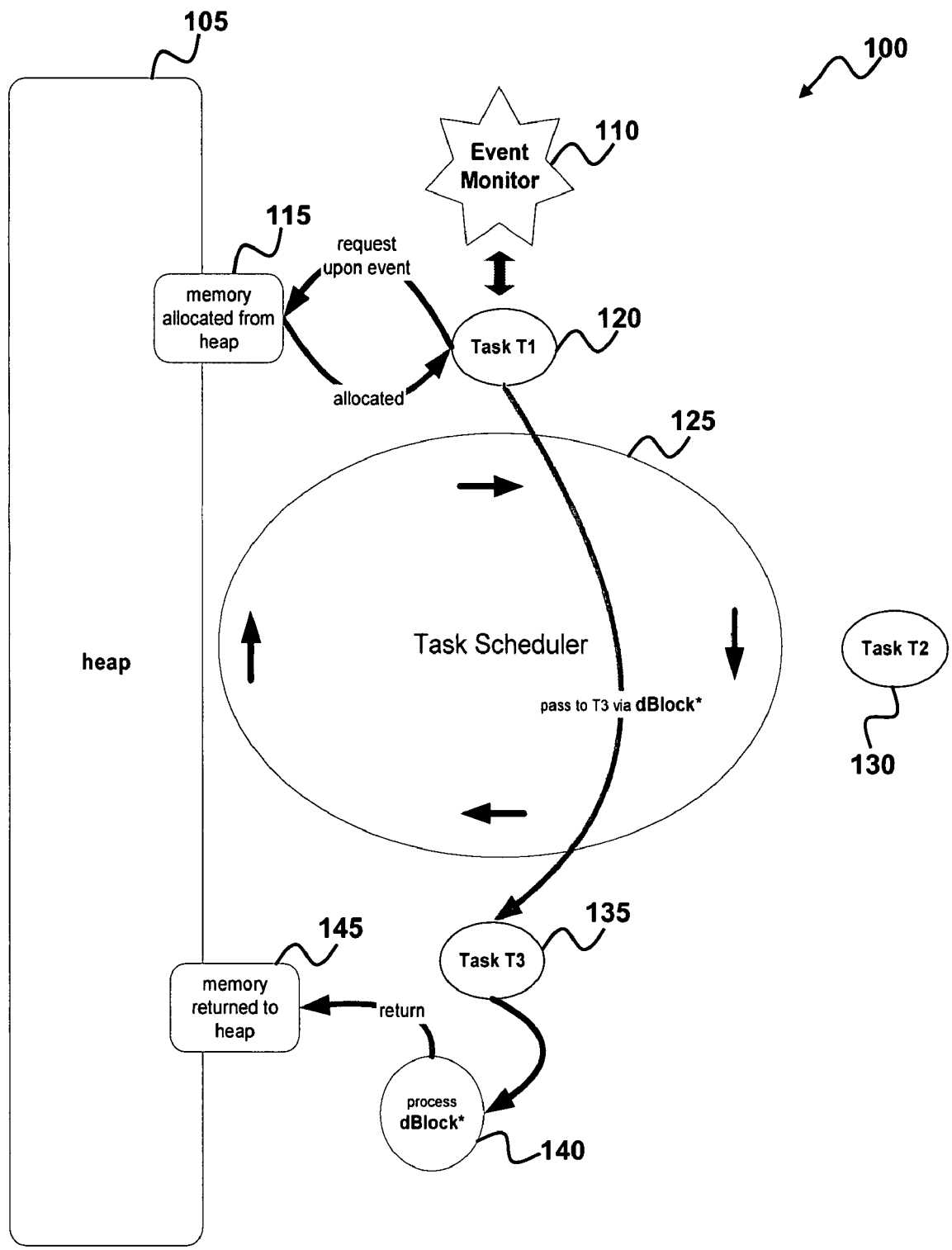
FIG. 1 illustrates a prior art schematic diagram of an information exchange process.
Figure 2:
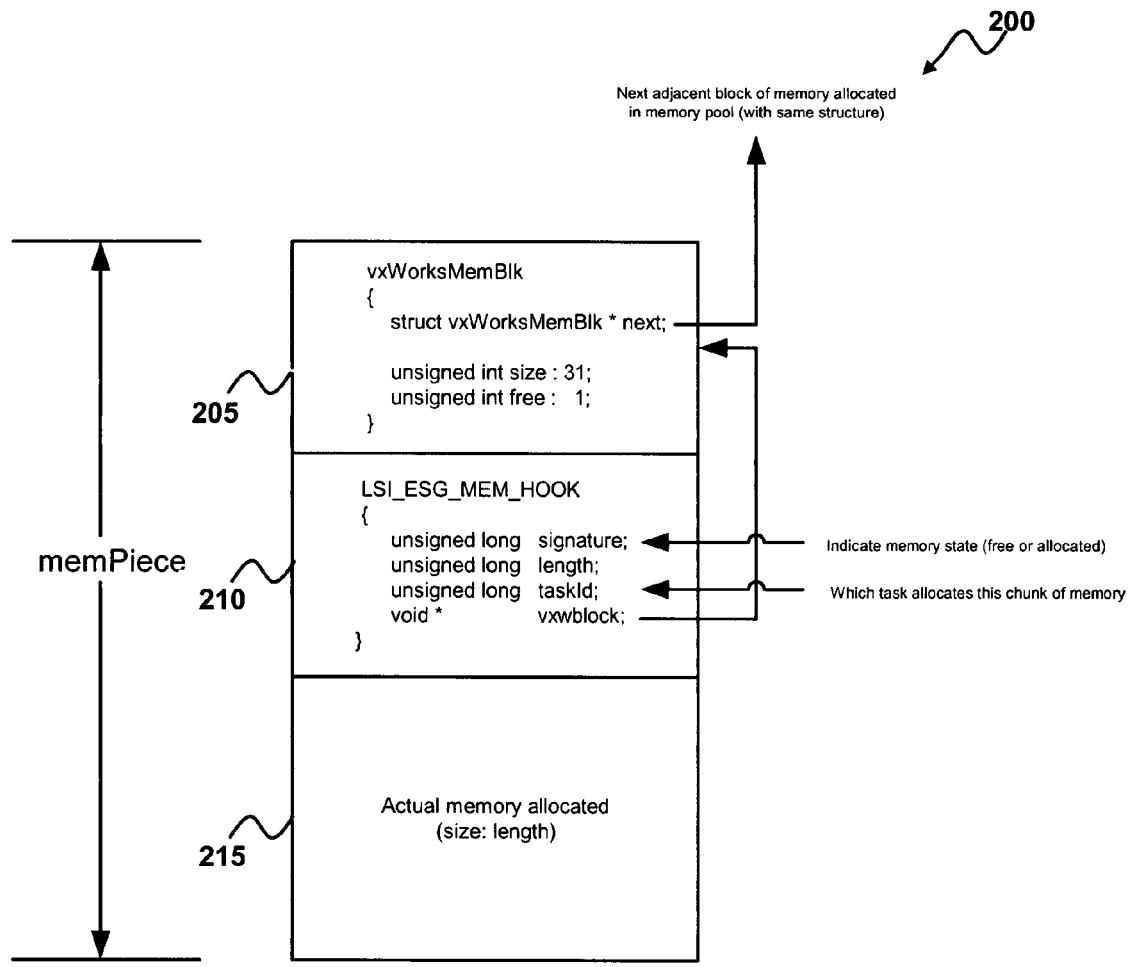
FIG. 2 illustrates a block diagram depicting the internal structure of a prior art allocated memory piece.
Figure 4:
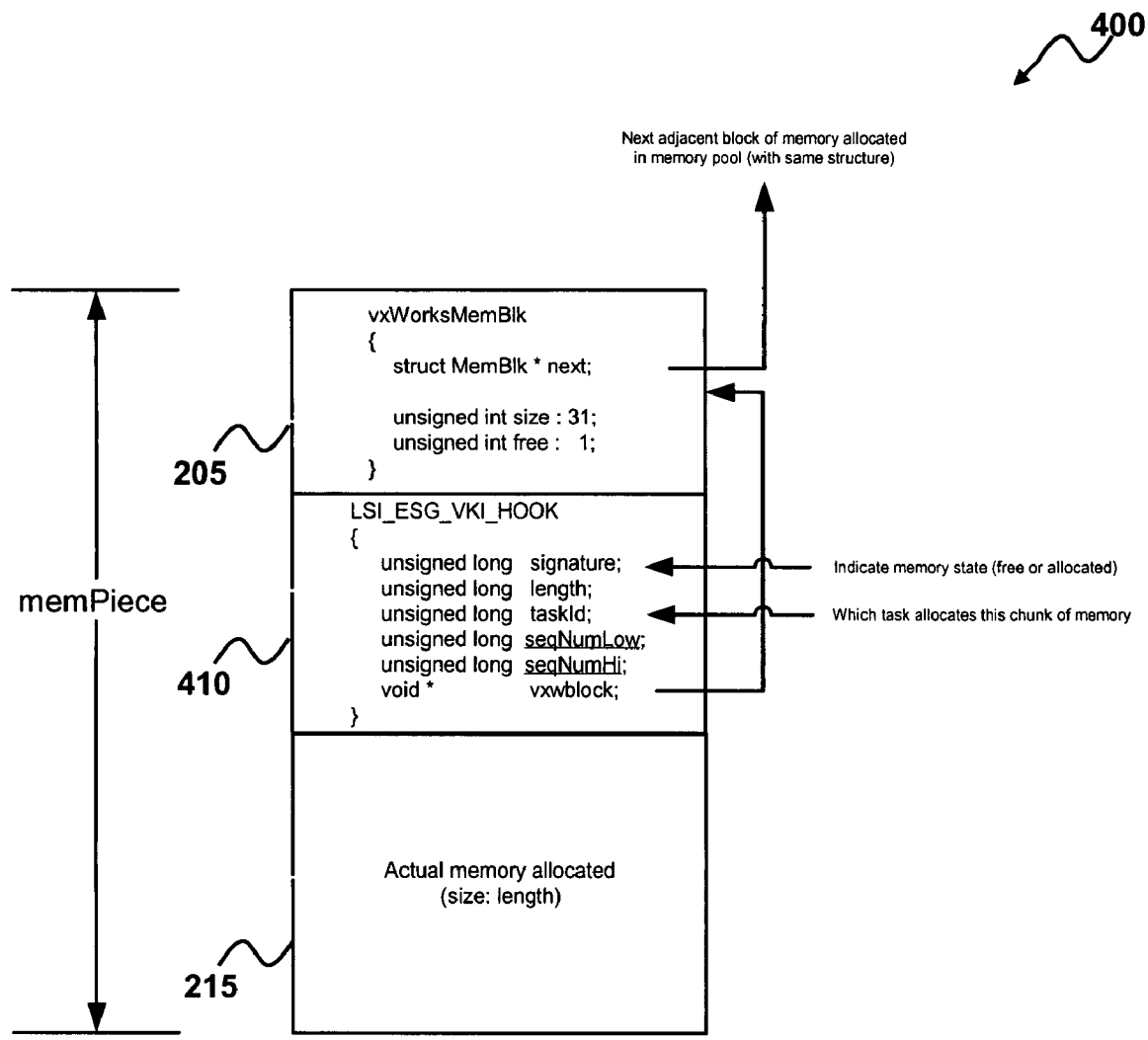
FIG. 4 illustrates an internal structure of an allocated memory piece, which can be implemented in accordance with a preferred embodiment.

FIG. 4 illustrates a diagram of an allocated memory piece 400, which can be implemented in accordance with a preferred embodiment. Note that in FIGS. 2 and 4, identical or similar parts or elements are generally indicated by identical reference numerals. Thus, the internal structure of the allocated memory piece 400 depicted in FIG. 4 can include the structure of "vxWorksMemBlk" 205, actual memory allocated 215 and the modified structure of "LSI_ESG_VKI_HOOK" 410. The structure of the allocated memory piece 400 (i.e., mempiece) can be provided as follows:

```
struct memPiece
{
    struct vxWorksMemBlk
    {
        struct vxWorksMemBlk * next;
        unsigned int size : 31;
        unsigned int free : 1;
    };
    struct LSI_ESG_MEM_HOOK
    {
        unsigned long  signature;
        unsigned long  length;
        unsigned long  taskId;
        unsigned long  seqNumLow;
        unsigned long  seqNumHi;
        void *         vxwblock;
    };
    byte * memBody;
}
```

The unsigned long variables "seqNumLow" and "seqNumHi" can be included in the structure of "LSI_ESG_MEM_HOOK" 210 to obtain the modified structure of "LSI_ESG_MEM_HOOK" 410.

Figure 5:
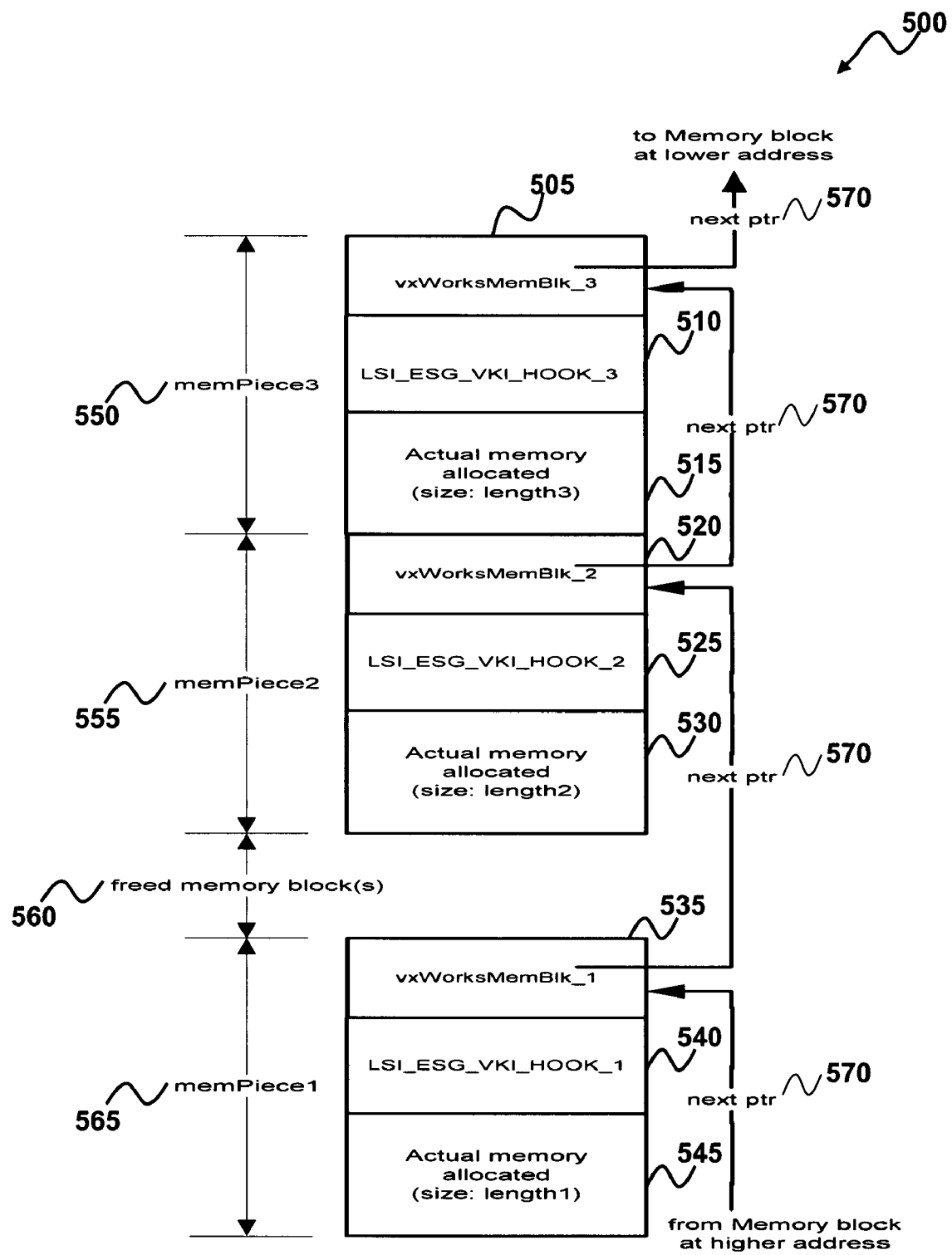
FIG. 5 illustrates an internal structure of allocated memory blocks chained via pointers, which can be implemented in accordance with a preferred embodiment.

FIG. 5 illustrates an internal structure 500 of allocated memory pieces chained via pointers, which can be implemented in accordance with a preferred embodiment. The internal structure 500 contains a freed memory block(s) 560 and memory pieces such as mempiece1 565, mempiece2 555 and mempiece3 550. The mempiece1 565 includes an actual allocated memory 545 and headers such as "vsWorksMemBlk_1" 535 and "LSI_ESG_VKI_HOOK_1" 540. The mempiece2 555 has an actual allocated memory 530 and headers such as "vsWorksMemBlk_2" 520 and "LSI_ESG_VKI_HOOK_2" 525. The mempiece3 550 has an actual allocated memory a515 and headers such as "vsWorksMemBlk_3" 505 and "LSI_ESG_VK1_HOOK_3" 510. The mempieces such as mempiece1 565, mempiece2 555 and mempiece3 550 can be chained via a pointer(s) 570. The "vxWorksMemBlk_1" 535, "vxWorksMemBlk_2" 520 and "vxWorksMemBlk_3" 510 have a pointer(s) 570 which holds address of next "vxWorksMemBlk" (not shown).

The overhead caused by sequence number increments and assignments should have only a negligible impact on the performance of data-processing apparatus 300. Additional resource requirements by introducing 8 bytes of memory for each memory piece allocated are not considered an issue for a modern RAID controller system, which typically has a memory pool of no less than 100 megabytes.

Figure 6:
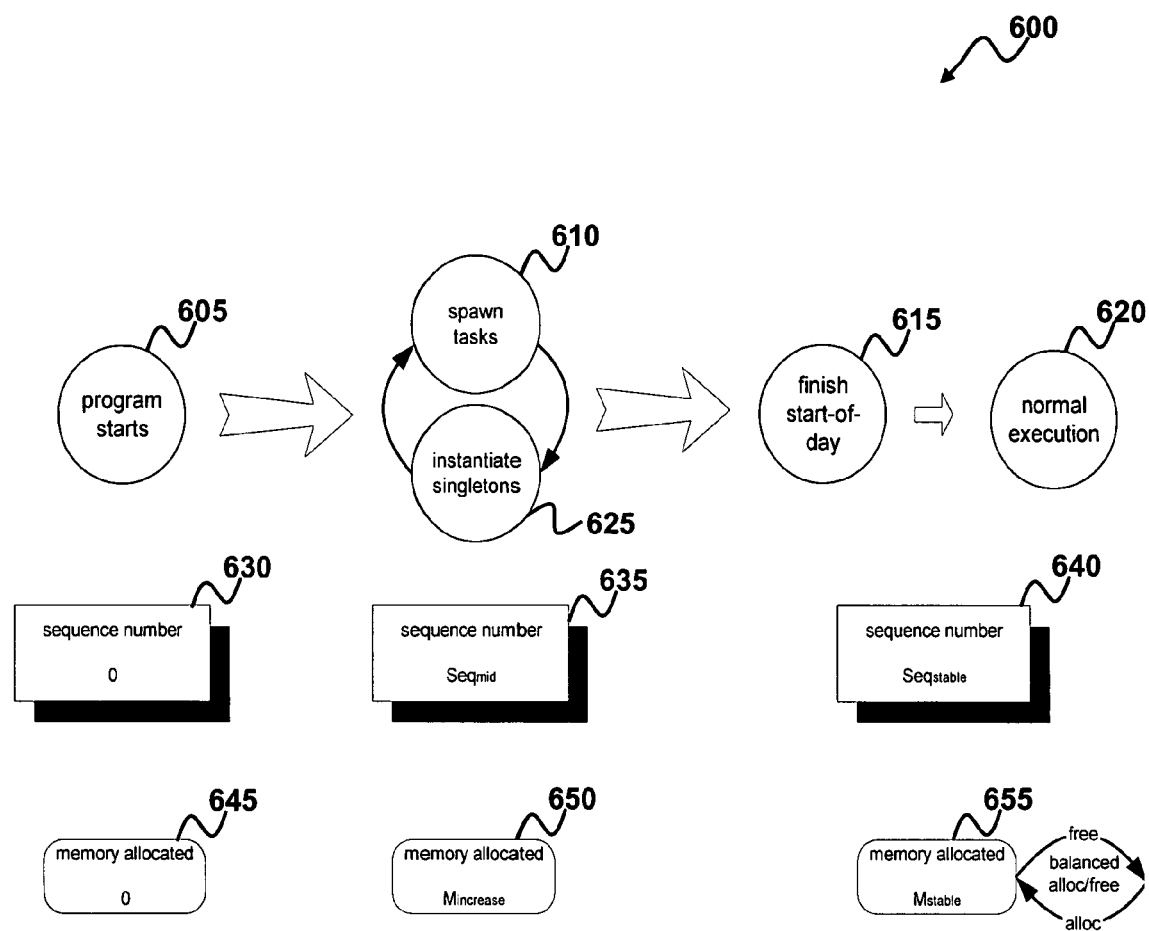
FIG. 6 illustrates a schematic diagram explaining memory allocation and sequence number values for a data-processing system without memory leak, which can be implemented in accordance with a preferred embodiment.

FIG. 6 illustrates a flow diagram of a method 600 for providing memory allocation and sequence number values for a data-processing system without memory leak, which can be implemented in accordance with a preferred embodiment. Actual memory management (allocation and free) can be implemented at the OS level, and this can guarantee that the memory allocations can occur one after another. The introduction of the sequence number can be used to indicate the order of the allocation activity, as well as the "ages" of memory blocks still in use.

Some assumptions can be made to facilitate the memory leak detection analysis. Only a limited amount of global data structures (e.g., singletons) that allocate memory can be present at the start-of-day, and these memory blocks are preferably never freed as long as the program itself remains in an execution mode. Here start-of-day represents a series of tasks, program loads, etc performed by an Information Technology (IT) department to make the system available for staff use at the beginning of the working day. A point exists (sequence number) after which dynamic memory allocation and free can be balanced if there is no external disturbance. Upon external disturbance, the system should return to a balance in predictable time. The existing internal memory monitoring utilities provided by "vxWorks" and LSI-ESG can still be available. Only recursive memory leaks can be diagnosed. It is considered to be non-disastrous with one-time memory leaks.

As indicated at block 605, the program execution begins and thereafter, the sequence number and memory allocated can be set to zero as indicated respectively at blocks 630 and 645. A new task can be invoked and the singletons in the task can be instantiated as depicted respectively at blocks 610 and 625. At this point of execution, the sequence number can be located at a middle value and the memory allocation increases as illustrated respectively at blocks 635 and 650. Thereafter, the execution proceeds till end-of-day (finish SOD) as depicted at block 615. Finally, as indicated at block 620, the normal execution of program takes place with a stable sequence number and stable memory allocated as depicted respectively at blocks 640 and 655. After the data-processing system becomes stable, although the sequence number still increases with the ongoing memory activity, the overall memory size in use should no longer change over time, namely, the memory blocks allocated can eventually be freed and returned to the memory pool.

Figure 7:
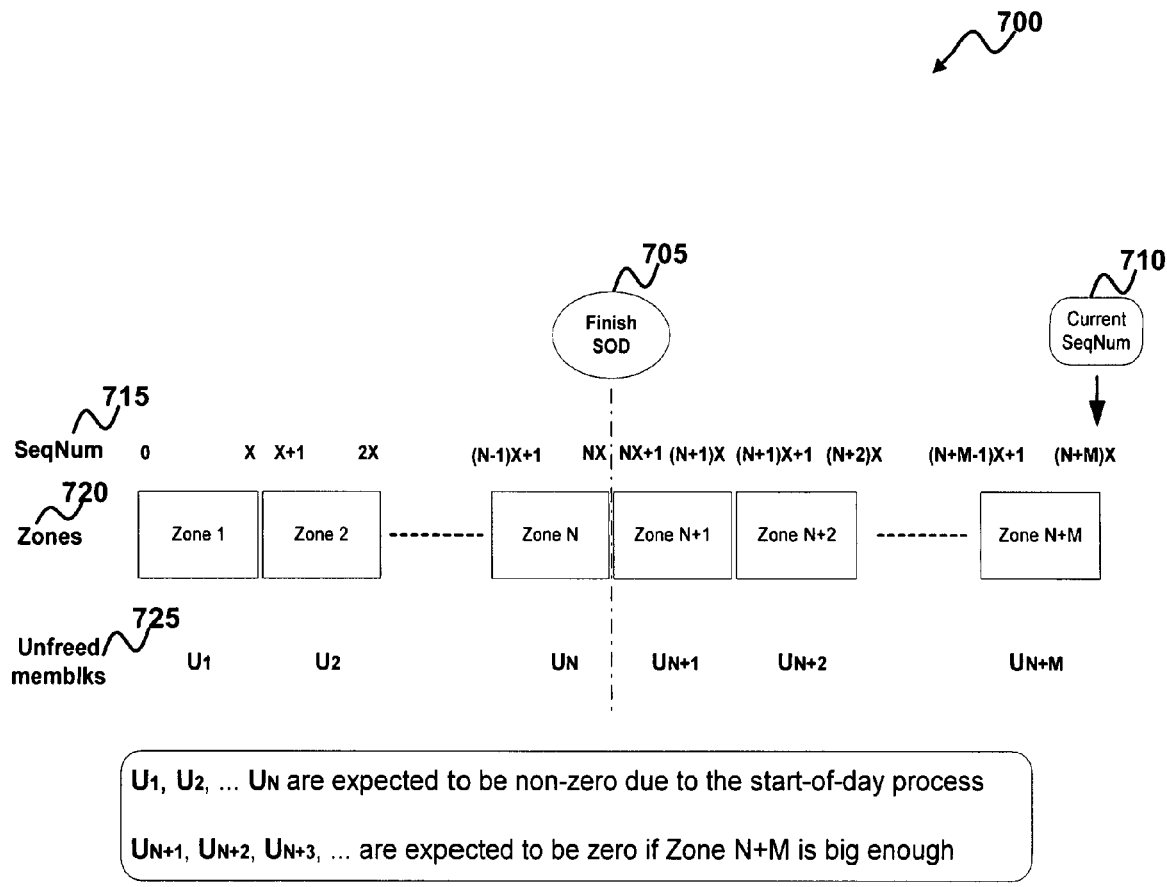
FIG. 7 illustrates a schematic diagram of sequence number analysis for a data-processing system without memory leak, which can be implemented in accordance with a preferred embodiment.

FIG. 7 illustrates a schematic diagram of a sequence number analysis 700 for a data-processing system without memory leak, in accordance with a preferred embodiment. As indicated in FIG. 7, a plurality of sequence Number (SN) zones 720 can be denoted by Zone 1, Zone 2, ... Zone N, etc. The sequence numbers (SN) 715 denoted by 0, X, X+1, ... (N+M)X and the un-free memory blocks 725 can be denoted by $U_1, U_2, U_3, \ldots U_{N+M}$. If Zone N+M (i.e., current memory allocation sequence number 710) is large enough, the memory blocks allocated after start-of-day (SOD), with sequence numbers in Zones N+1, N+2, N+3, . . . , can be expected to be all freed and returned to the memory pool. Also, as the program execution (and therefore more memory allocation activity) continues, an increasingly number subsequent SN zones can be expected to be freed up in order. The finish of the SOD can then occur as indicated at block 705.

The memory leak detection process involves monitoring the count of un-freed memory blocks for the SN zones (after SOD) smaller than the current SN zone. If the un-freed memory blocks exist and follow a similar pattern for all the other adjacent SN zones, this is a good sign of memory leak.

The SN zone layout can appear similar to the following example of a typical RAID controller with unbalanced memory allocation/free after the system SOD is complete.

| SNZone | seqNum range<hex>[min, max) | un-freed memory blocks |
|---|---|---|
| 1 | [00000000–00100000) | 0x204F |
| 2 | [00100000–00200000) | 0x10AC |
| 3 | [00200000–00300000) | 0x3F |
| 4 | [00300000–00400000) | 0x20 |
| ... | | |
| 9 | [00800000–00900000) | 0x0A |
| 10 | [00900000–00A00000) | 0 |
| 11 | [00A00000–00B00000) | 0 |
| 12 | [00B00000–00C00000) | 0 |
| ... | | |

SN zone at zone 2 indicates the Start-of-Day finishes at sequence number 0x1F0385 and SN zone at zone 9 indicates the current sequence number 0x8643FB. Apparently, SN zones 3 to 9 (where the current sequence number lies in) have experienced memory leaks. SN zone 2 probably also has had some leaked memory blocks, however, it is safe to investigate the problem from the SN zone immediately after the SOD so that the leaked memory block counts are relatively small and easier to track down.

If a memory leak is detected and is believed to be recursive (tasks are executed recursively), it is important to track down the sources as quickly as possible. For a large program, such as RAID controller firmware, there can be commonly more than one such memory leak source from more than just one task. The memory resource on a modern RAID controller should be sufficient to tolerate at least hours of unintentional memory leaks, if not days. Therefore, it provides enough time for the developers to track down the memory leak patterns and sources before the system eventually crashes.

There exist some built-in utilities (accessible via shell commands) in the "vxWorks" package that allow developers to inspect the memory state on the fly. These commands are "memShow" and "memoryShow", with different options. Note that the supported shell commands cannot be executed via a standalone task, but through the existing shell task. No dynamic memory allocation is needed with the shell debug process. Together with these shell commands, the task information, caller information, the sequence number, memory allocation size, as well as the pointer to the next allocated memory block, are also free to use.

The following represents a sample output for a SN zone that is suspected to possess memory leaks, where "memLeakDebug" represents a shell command that takes the SN zone number as its parameter:

```
-> memLeakDebug 8
Dump between seq# 0x80000 0x90000
# 1: addr=0x02adc6bc size=0x0228 vxw=0x2adc6c4
tname=melTask seq=8fa7a
# 2: addr=0x02adc8e4 size=0x0228 vxw=0x2adc8ec
tname=melTask seq=8f248
# 3: addr=0x02adcb0c size=0x0228 vxw=0x2adcb14
tname=melTask seq=8ee12
# 4: addr=0x02adcd34 size=0x0228 vxw=0x2adcd3c
tname=melTask seq=8e5e0
# 5: addr=0x02adcf5c size=0x0228 vxw=0x2adcf64
tname=melTask seq=8ddb3
```

-continued

```
# 6: addr=0x02add184 size=0x0228 vxw=0x2add18c
tname=melTask seq=8d978
# 7: addr=0x02add3ac size=0x0228 vxw=0x2add3b4
tname=melTask seq=8d150
# 8: addr=0x02af1ad8 size=0x0228 vxw=0x2af1ae0
tname=melTask seq=80d10
# 9: addr=0x02af1d00 size=0x0228 vxw=0x2af1d08
tname=melTask seq=804e3
```

To isolate the memory leak, the task name and allocation size can be utilized as an entry point to follow the execution path and as a search key respectively. Further, the memory block address can be used to dump the memory block data such as pointer to next block, the actual information in the memory block (e.g., error log task can give the context on what is to be logged in ASCII).

For the example described above, SN zone 8 sees recursive un-freed memory blocks with "melTask", which has a memory block size of 0x228. A further memory dump (another built-in support at OS level) at 0x02adc6bc (first entry) provides the following information.

```
-> d 0x02adc6bc, 0x20, 4
02adc6b0:              02adc494 *        *
02adc6c0: 00000114 52504d56 00000200 03ae8b68 *....VMPR....h...*
02adc6d0: 00000000 0008fa7a 02adc6c4 ffffffff *....z...........*
02adc6e0: ffffffff 626d7953 53736f69 65747379 *....SymbiosSyste*
02adc6f0: 4c454d6d 00000000 447d54da 00000734 *mMEL......T}D4...*
02adc700: 00000000 00000000 00000000 0000095f *..............._...*
02adc710: 00000000 00000000 0000095f 00000000 *........._.......*
02adc720: 00000000 00000000 00000000 00000000 *.................*
02adc730: 00000000 00000000 00000000          *................*
```

By combining all the information the right module, right task and even the actual code which did the leaked allocation, can be pinpointed and therefore one can figure out when/where the life of the allocated memory should be terminated.

Figure 8:
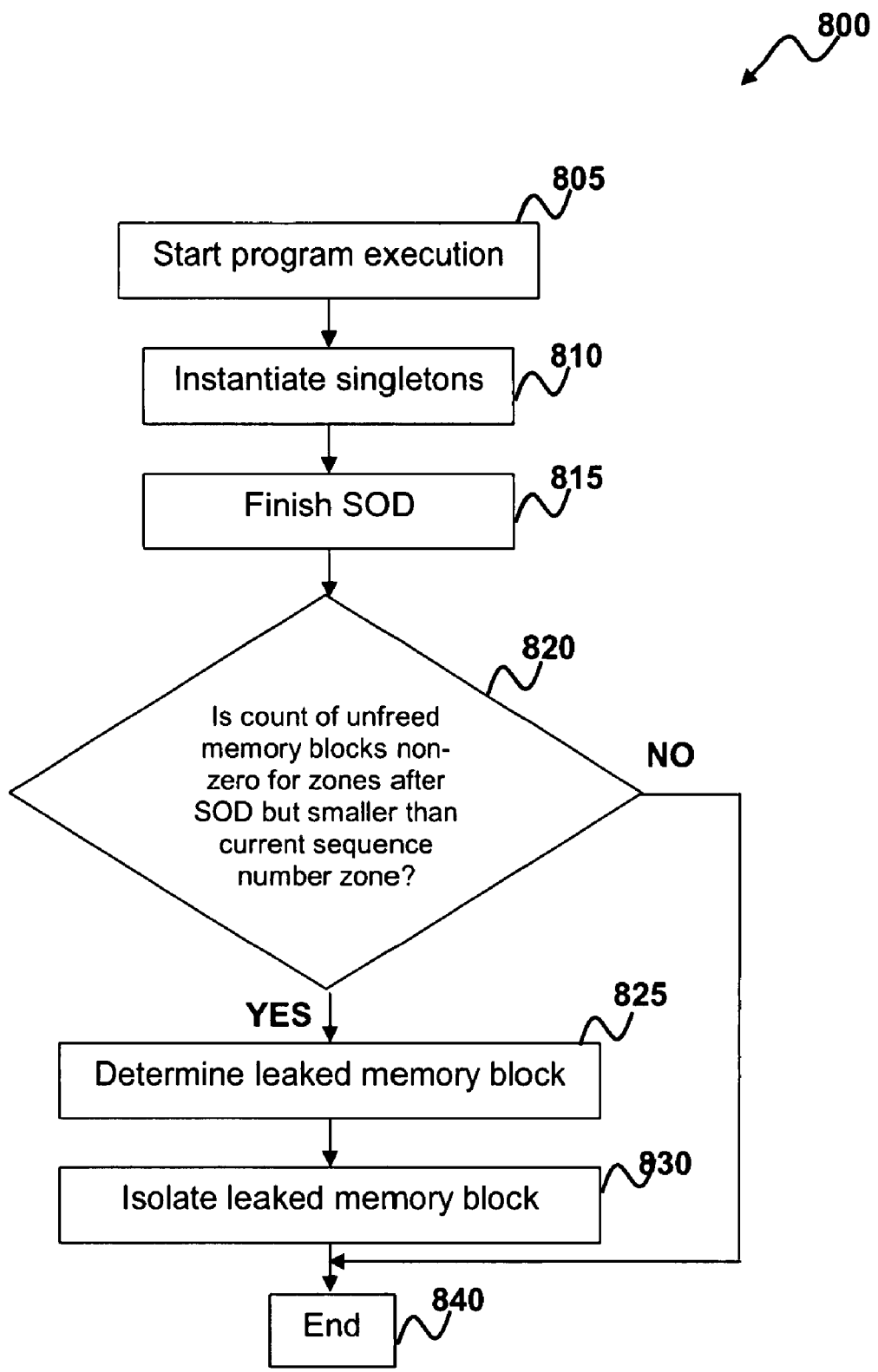
FIG. 8 illustrates a high level flow chart of operations depicting logical operational steps of a method for detecting and isolating memory leak using sequence number, in accordance with an alternative embodiment.

FIG. 8 illustrates a high level flow chart of operations depicting logical operational steps of a method 800 for detecting and isolating memory leak using sequence number, in accordance with an alternative embodiment. The program execution can be initiated as depicted at block 805. At the start-of-day (SOD), the sequence number and memory allocated can be set to zero. The singletons can be instantiated thereafter as indicated at block 810. As depicted at block 815, the memory allocation and sequence number increases until the completion of the SOD. The system depicted at FIG. 3 monitors whether the count of un-freed memory blocks after SOD (but smaller than current sequence number zone) is decremented to zero as indicated at block 820. If the count of un-freed blocks for sequence zones after SOD is not eventually decremented to zero as depicted at block 825, the leaked memory block can be determined; otherwise, as depicted at block 840 the process terminates. The leaked memory blocks can be isolated utilizing the shell commands such as "memLeakDebug", "memShow" and "memoryShow", task information, caller information, the sequence number, memory allocation size and pointer to next allocated memory block. Finally, after isolating the leaked memory block the process ends as illustrates at block 840.

Figure 9:
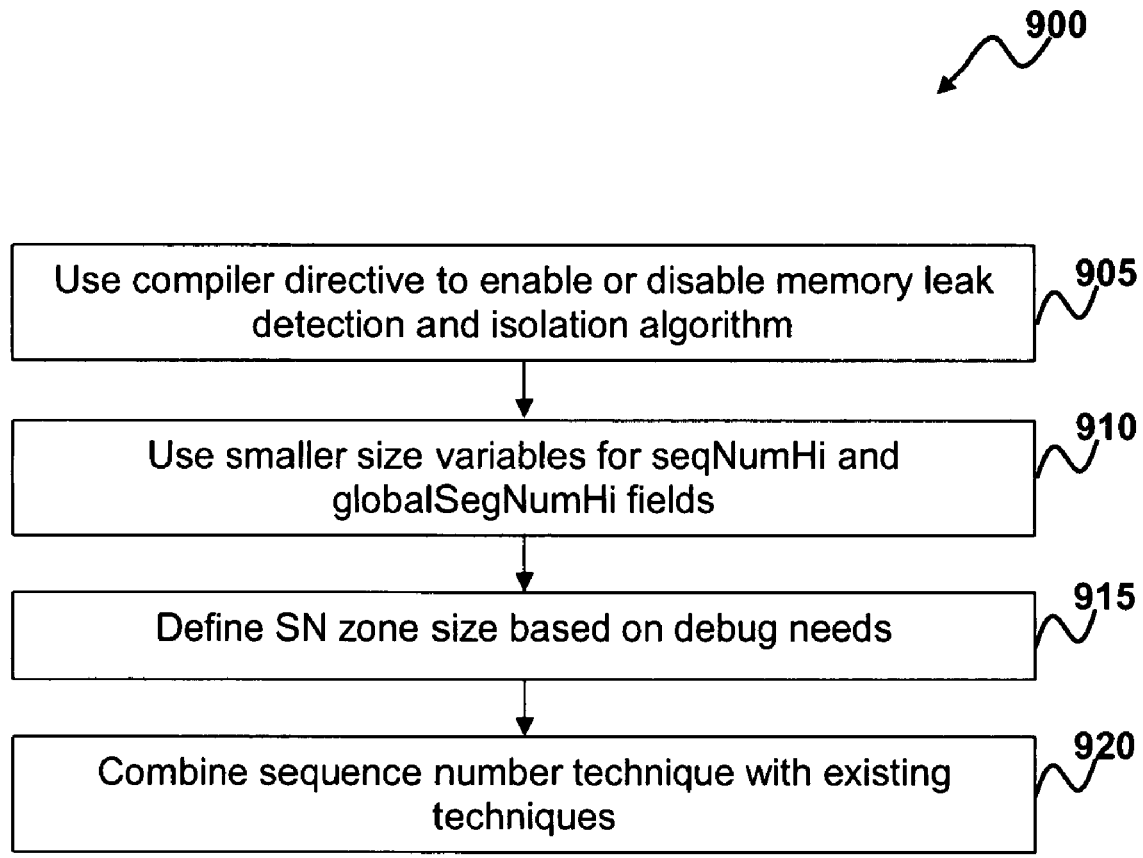
FIG. 9 illustrates a high level flow chart of operations depicting logical operational steps of a method for optimization and performance tuning using a compiler directive mechanism, in accordance with an alternative embodiment.

FIG. 9 illustrates a high level flow chart of operations depicting logical operational steps of a method 900 for optimization and performance tuning using a compiler directive mechanism, in accordance with an alternative embodiment. The compiler directive "#ifdef" can be used to enable/disable the memory leak detection and isolation algorithm on a work-as-needed basis as depicted at block 905. The structure of mempiece using sequence number and compiler directive are shown below.

```
struct memPiece
{
    struct vxWorksMemBlk
    {
        struct vxWorksMemBlk * next;
        unsigned int size : 31;
        unsigned int free : 1;
    };
    struct LSI_ESG_MEM_HOOK
    {
        unsigned long  signature;
        unsigned long  length;
        unsigned long  taskId;
        #ifdef MEM_LEAK_DEBUG
        unsigned long  seqNumLow;
        unsigned long  seqNumHi;
        #endif
        void *  vxwblock;
    };
    byte * memBody;
}
```

As depicted at block 910, a smaller size variable can be used for the "seqNumHi" and "globalSeqNumHi" fields. A byte value can be sufficient. In this case, the "maxSeqNum" becomes $$MAX((globalSeqNumHi << 32) + globalSeqNumLow)$$
$$= (0xFF << 32) + 0xFFFFFFFF$$
$$= 0xFFFFFFFFFF$$
$$= 1,099,511,627,775$$

This still allows the system to run more than 34 years without being rebooted at 1000 memory allocations/second and without over-wrapping the sequence number.

As indicated at block 915, the SN zone size can be defined based on debug requirements. For a system experiencing frequent memory allocations, a large zone size can be utilized; otherwise, a smaller SN zone can be used. Also, not all of the zones need to be of the same size. The following zone definition can be implemented in the context of a RAID firmware product.

```
# 1 [0x00000000->0x00002000)
# 2 [0x00002000->0x00004000)
# 3 [0x00004000->0x00008000)
# 4 [0x00008000->0x00010000)
# 5 [0x00010000->0x00020000)
# 6 [0x00020000->0x00040000)
# 7 [0x00040000->0x00080000)
# 8 [0x00080000->0x00100000)
# 9 [0x00100000->0x00200000)
#10 [0x00200000->0x00400000)
#11 [0x00400000->0x00800000)
#12 [0x00800000->0x01000000)
#13 [0x01000000->0x02000000)
#14 [0x02000000->0x04000000)
#15 [0x04000000->0x08000000)
#16 [0x08000000->0x10000000)
#17 [0x10000000->0x20000000)
#18 [0x20000000->0x40000000)
#19 [0x40000000->0x60000000)
```

-continued

```
#20 [0x60000000->0x80000000)
#21 [0x80000000->0xA0000000)
#22 [0xA0000000->0xC0000000)
#23 [0xC0000000->0xE0000000)
#24 [0xE0000000->0xFFFFFFFF)
```

The sequence number technique can be combined with exiting techniques to better serve the memory leak/isolation process as said at block 920. The combinational use of these tools gives faster, more accurate diagnostic results.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for detecting and isolating a plurality of memory leak blocks using a sequence number, comprising:
    utilizing a sequence number for indicating an order of memory allocation in a data-processing system, wherein said sequence number comprises a plurality of unsigned integers with an initial value of zero;
    dividing a memory into a plurality of sequence number zones and thereafter monitoring a count of a plurality of un-freed memory blocks after a finish of a start-of-day (SOD) operation;
    detecting said plurality of memory leak blocks when said count of said plurality of un-freed memory blocks for sequence number zones after said finish of said SOD operation, but smaller than a current sequence number zone, is not eventually decremented to zero, in order to thereby detect and isolate a plurality of memory leak blocks associated with said data-processing system; and
    instantiating a plurality of global data structures by allocating memory in said data-processing system prior to using said sequence number for indicating said order of memory allocation in said data-processing system.

2. The method of claim 1 further comprising:
    isolating said plurality of memory leak blocks utilizing shell commands, task information, caller information, sequence number information, memory allocation size and a pointer to a next allocation memory block; and
    performing an optimization and a performance tuning operation with respect to said data-processing system utilizing a compiler directive mechanism.

3. The method of claim 1 further comprising incrementing said sequence number in response to instantiating said plurality of global data structures.

4. The method of claim 2 wherein performing said optimization and said performance tuning operation with respect to said data-processing system using said compiler directive mechanism, further comprises:
    utilizing said compiler directive mechanism to enable/disable a memory leak detection and an isolation algorithm on a work-as-needed basis;
    utilizing a smaller size variable for said sequence number;
    defining said plurality of sequence number zones based on debug needs; and
    combining said optimization and said performance tuning operation with at least one other memory leak detection and isolation operation.

5. The method of claim 1 further comprising:
instantiating a plurality of global data structures by allocating memory in said data-processing system prior to using said sequence number for indicating said order of memory allocation in said data-processing system;
isolating said plurality of memory leak blocks utilizing shell commands, task information, caller information, sequence number information, memory allocation size and a pointer to a next allocation memory block; and
performing an optimization and a performance tuning operation with respect to said data-processing system utilizing a compiler directive mechanism.

6. The method of claim 5 wherein performing said optimization and said performance tuning operation with respect to said data-processing system using said compiler directive mechanism, further comprises:
utilizing said compiler directive mechanism to enable/disable a memory leak detection and an isolation algorithm on a work-as-needed basis;
utilizing a smaller size variable for said sequence number;
defining said plurality of sequence number zones based on debug needs; and
combining said optimization and said performance tuning operation with at least one other memory leak detection and isolation operation.

7. The method of clam 5 further comprising incrementing said sequence number in response to instantiating said plurality of global data structures.

8. The method of claim 1 further comprising:
instantiating a plurality of global data structures by allocating memory in said data-processing system prior to using said sequence number for indicating said order of memory allocation in said data-processing system;
incrementing said sequence number in response to instantiating said plurality of global data structures;
isolating said plurality of memory leak blocks utilizing shell commands, task information, caller information, sequence number information, memory allocation size and a pointer to a next allocation memory block; and
performing an optimization and a performance tuning operation with respect to said data-processing system utilizing a compiler directive mechanism, wherein performing said optimization and said performance tuning operation with respect to said data-processing system using said compiler directive mechanism, further comprises:
utilizing said compiler directive mechanism to enable/disable a memory leak detection and an isolation algorithm on a work-as-needed basis;
utilizing a smaller size variable for said sequence number;
defining said plurality of sequence number zones based on debug needs; and
combining said optimization and said performance tuning operation with at least one other memory leak detection and isolation operation.

9. A method for detecting and isolating a plurality of memory leak blocks using a sequence number, comprising:
instantiating a plurality of global data structures by allocating memory in a data-processing system prior to using said sequence number for indicating an order of memory allocation in said data-processing system;
incrementing said sequence number in response to instantiating said plurality of global data structures;
utilizing said sequence number for indicating an order of memory allocation in said data-processing system, wherein said sequence number comprises a plurality of unsigned integers with an initial value of zero;
dividing a memory into a plurality of sequence number zones and thereafter monitoring a count of a plurality of un-freed memory blocks after a finish of a start-of-day (SOD) operation; and
detecting said plurality of memory leak blocks when said count of said plurality of un-freed memory blocks for sequence number zones after said finish of said SOD operation, but smaller than a current sequence number zone, is not eventually decremented to zero, in order to thereby detect and isolate a plurality of memory leak blocks associated with said data-processing system.

10. The method of claim 9 further comprising:
isolating said plurality of memory leak blocks utilizing shell commands, task information, caller information, sequence number information, memory allocation size and a pointer to a next allocation memory block; and
performing an optimization and a performance tuning operation with respect to said data-processing system utilizing a compiler directive mechanism.

11. The method of claim 9 wherein performing said optimization and said performance tuning operation with respect to said data-processing system using said compiler directive mechanism, further comprises:
utilizing said compiler directive mechanism to enable/disable a memory leak detection and an isolation algorithm on a work-as-needed basis;
utilizing a smaller size variable for said sequence number;
defining said plurality of sequence number zones based on debug needs; and
combining said optimization and said performance tuning operation with at least one other memory leak detection and isolation operation.

12. A computer-implemented system for detecting and isolating a plurality of memory leak blocks using a sequence number, said system comprising:
a data-processing apparatus;
a module executed by said data-processing apparatus, said module and said data-processing apparatus being operable in combination with one another to:
utilize a sequence number for indicating an order of memory allocation in said data-processing system, wherein said sequence number comprises a plurality of unsigned integers with an initial value of zero;
divide a memory into a plurality of sequence number zones and thereafter monitoring a count of a plurality of un-freed memory blocks after a finish of a start-of-day (SOD) operation;
detect said plurality of memory leak blocks when said count of said plurality of un-freed memory blocks for sequence number zones after said finish of said SOD operation, but smaller than a current sequence number zone, is not eventually decremented to zero, in order to thereby detect and isolate a plurality of memory leak blocks associated with said data-processing system; and
instantiate a plurality of global data structures by allocating memory in said data-processing system prior to using said sequence number for indicating said order of memory allocation in said data-processing system.

13. The system of claim 12 wherein said data-processing apparatus and said module are further operable in combination with one another to:
isolate said plurality of memory leak blocks utilizing shell commands, task information, caller information, sequence number information, memory allocation size and a pointer to a next allocation memory block; and perform an optimization and a performance tuning operation with respect to said data-processing system utilizing a compiler directive mechanism.

14. The system of claim 13 wherein said data-processing apparatus and said module are further operable in combination with one another to increment said sequence number in response to instantiating said plurality of global data structures.

15. The system of claim 13 wherein said data-processing apparatus and said module are further operable in combination with one another to:

utilize said compiler directive mechanism to enable/disable a memory leak detection and an isolation algorithm on a work-as-needed basis;

utilize a smaller size variable for said sequence number;

define said plurality of sequence number zones based on debug needs; and combine said optimization and said performance tuning operation with at least one other memory leak detection and isolation operation.

16. The system of claim 12 wherein said data-processing apparatus and said module are further operable in combination with one another to:

instantiate a plurality of global data structures by allocating memory in said data-processing system prior to using said sequence number for indicating said order of memory allocation in said data-processing system;

isolate said plurality of memory leak blocks utilizing shell commands, task information, caller information, sequence number information, memory allocation size and a pointer to a next allocation memory block; and perform an optimization and a performance tuning operation with respect to said data-processing system utilizing a compiler directive mechanism.

17. The system of claim 16 wherein said data-processing apparatus and said module are further operable in combination with one another to utilize said compiler directive mechanism to enable/disable a memory leak detection and an isolation algorithm on a work-as-needed basis;

utilize a smaller size variable for said sequence number;

define said plurality of sequence number zones based on debug needs; and combine said optimization and said performance tuning operation with at least one other memory leak detection and isolation operation.

18. The system of clam 17 wherein said data-processing apparatus and said module are further operable in combination with one another to increment said sequence number in response to instantiating said plurality of global data structures.

* * * * *